(12) United States Patent
Ueda et al.

(10) Patent No.: US 7,416,774 B2
(45) Date of Patent: *Aug. 26, 2008

(54) PRECOATED METAL SHEET FOR LIGHT REFLECTORS

(75) Inventors: Kohei Ueda, Futtsu (JP); Hiroshi Kanai, Futtsu (JP); Ikuya Inoue, Kimitsu (JP); Nobukatsu Komatu, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 367 days.

This patent is subject to a terminal disclaimer.

(21) Appl. No.: 10/545,846

(22) PCT Filed: Feb. 23, 2004

(86) PCT No.: PCT/JP2004/002063

§ 371 (c)(1),
(2), (4) Date: Aug. 16, 2005

(87) PCT Pub. No.: WO2004/076173

PCT Pub. Date: Sep. 10, 2004

(65) Prior Publication Data

US 2006/0147721 A1 Jul. 6, 2006

(30) Foreign Application Priority Data

Feb. 25, 2003 (JP) ............................. 2003-047611
Aug. 5, 2003 (JP) ............................. 2003-206052
Oct. 28, 2003 (JP) ............................. 2003-367622

(51) Int. Cl.
*B32B 5/16* (2006.01)
*B32B 15/08* (2006.01)
*B32B 15/18* (2006.01)

(52) U.S. Cl. .................. 428/141; 428/421; 428/457
(58) Field of Classification Search .................. 428/141, 428/421, 457
See application file for complete search history.

(56) References Cited

U.S. PATENT DOCUMENTS

| 4,985,815 A | 1/1991 | Endo | |
|---|---|---|---|
| 2006/0147673 A1* | 7/2006 | Ueda et al. | ............. 428/141 |

FOREIGN PATENT DOCUMENTS

| JP | 6-47870 | 2/1994 |
|---|---|---|
| JP | 10-730 | 1/1998 |
| JP | 10-732 | 1/1998 |
| JP | 10-25874 | 11/1998 |
| JP | 2000-66012 | 3/2000 |
| JP | 2001-96223 | 4/2001 |
| JP | 2002-172735 | 6/2002 |
| JP | 2002-228085 | 8/2002 |

* cited by examiner

*Primary Examiner*—Ramsey Zacharia
(74) *Attorney, Agent, or Firm*—Kenyon & Kenyon LLP

(57) ABSTRACT

The present invention provides a precoated metal sheet for light reflectors having a high diffuse reflectance of visible lights and an excellent heat absorptivity, and also provides the electric or electronic apparatus using it. The precoated metal sheet comprises a metal sheet or plated metal sheet, a visible light reflective coat on one surface of the sheet, and a heat absorptive coat on the other surface of the sheet. The visible light reflective coat has a diffuse reflectance of visible rays of not less than 0.7 in a wavelength of 400 to 700 nanometers. The heat absorptive coat has a total emissivity of infrared rays of not less than 0.7 in the range of wave number of 600 to 3000 $cm^{-1}$ measured at a certain temperature within the range of from 80 to 200 degrees centigrade.

9 Claims, 1 Drawing Sheet

PRECOATED METAL SHEET FOR LIGHT REFLECTORS

TECHNICAL FIELD

The present invention relates to a precoated metal sheet used as a material of a light reflector and to an electric or electronic apparatus which has a function to emit a visible ray and has a plate for reflecting the emitted visible ray, such as an illuminator, audiovisual equipment, mobile computing devices, a plasma display, and a liquid crystal television set.

BACKGROUND ART

An illuminator, audiovisual equipment, an electronic apparatus, mobile computing devices, a liquid crystal television, a plasma display, and the like have functions of making the surroundings bright, transmitting a light signal, projecting an optical image or the like, by emitting visible rays. Some of these apparatus have a light reflector and improve the luminance of light or change the direction of light by reflecting light using the reflector. Therefore, in order to avoid the drop of quantity of light when light reflects in a reflector, the surface of the reflector requires a high visible ray reflectance. As means for improving the reflectance on the surface of a reflector in the past, for example, a metal has been polished to make a mirror plane, or a white coating material with a high reflectance has been coated. Nippon Steel Corporation catalog "View coat" discloses a precoated steel sheet coated with a white coating material beforehand for light reflectors of an illuminator.

Japanese Unexamined Patent Publication No. Hei 10-000730 discloses a light reflecting film, excellent as a light reflector for a liquid crystal display, comprising a substrate film, a thin metal film layer laminated on one side of the substrate film, and a fine inorganic particle-containing resin layer laminated on the thin metal film layer, wherein the thin metal film layer is made of aluminum, and the reflective indices $n_f$ and $n_b$ satisfy the relationship $n_f - n_b \geq 0.4$ in which $n_f$ is the refractive index of the fine inorganic particle and $n_b$ is the refractive index of the resin. Japanese Unexamined Patent Publication No. 2002-172735 discloses a highly diffusing reflective coated metal panel used as a reflecting plate for the back light of a liquid crystal display, comprising an aluminum panel, an undercoat layer formed on the aluminum panel, and a topcoat layer formed on the undercoat layer, wherein the undercoat layer contains 100 parts by weight of a resin and 150 to 300 parts by weight of a titanium oxide pigment and has a film thickness of 50 to 100 micrometers, and the topcoat layer contains 100 parts by weight of a resin and 100 to 250 parts by weight of a titanium oxide pigment and has a gloss of not more than 15 and a film thickness of 10 to 30 micrometers. However, the need to form a light reflector used for an illuminator and for an electric apparatus, such as a liquid crystal display, into various shapes before use has been increasing with a complication of the structure and design of an electric apparatus in recent years.

However, when a film is used as a substrate as described in Japanese Unexamined Patent Publication No. Hei 10-000730, it is difficult to form a film, laminated with a metal thin film layer or a resin layer containing fine inorganic particles beforehand, into a target shape. Therefore, the film must be formed into the target shape in advance before laminating the metal thin film layer or the resin layer containing fine inorganic particles. However, when a shape of a light reflector is complicated, it is difficult to laminate a coat on the formed part with a uniform thickness.

On the other hand, according to the technique described in Japanese Unexamined Patent Publication No. 2002-172735, after applying an undercoat layer and a topcoat layer to an aluminum plate beforehand, the coated aluminum plate can be formed into a target shape. However, as the amount of titanium oxide added in a reflective coat was too high, the coat was weak, and there were problems that cracks occurred in the reflective coat or the coat peeled at the time of forming. Moreover, it also has a weak point in that formed shapes are limited because aluminum, which is the base metal does not have a good forming workability. Furthermore, it is very difficult to coat an undercoat with such a thickness (50 to 100 micrometers) at one time by a roll coater of a common precoating line, and it is necessary to coat two or more times, and therefore there is a weak point of low productivity.

Consequently, it was difficult to apply the light reflector described in Japanese Unexamined Patent Publications No. Hei 10-000730 or No. 2002-172735 to an electric apparatus which must employ a light reflector formed into a certain shape for the reasons of the structure or design of the electric apparatus, and it was necessary to employ a conventional precoated steel sheet for light reflectors of illuminators which was beforehand coated with a white paint.

On the other hand, the problem of generation of heat of an electric apparatus has occurred with the computerization of electric apparatus in recent years. As means to solve this heat problem, Japanese Unexamined Patent Publication No. 2002-228085 discloses a technique for improving a heat radiative property by making the emissivity of thermal radiation of the inner layer coating film of a metal surface not less than 70 percent.

SUMMARY OF THE INVENTION

There is a growing demand for the above-mentioned electric apparatus to be brighter and to have the same brightness in spite of using less electric power. There is also a growing demand for an electric apparatus, which must employ a light reflector formed into a certain shape, to be brighter and to have the same brightness in spite of using less electric power.

The present invention aims at providing a precoated metal sheet for light reflectors having an elevated diffuse reflectance of visible rays, a precoated metal sheet for light reflectors excellent in a heat absorptivity, and an electric or electronic apparatus using the same.

The inventors have found that the brightness of illumination increased when a heat absorptive coat was coated on one surface of a light reflector having a coat excellent in a visible light reflectivity on the other surface thereof as a result of study.

The inventors also found the following:

When a titanium oxide is added to a fluororesin-containing binder resin, if the content of titanium oxide is too small, a visible ray passes through the coat, or the visible ray reflectivity of the coat is low because the gross area of the interfaces between the binder resin and the titanium oxide is small. As the content of titanium oxide increases, a visible ray transmittance through the coat decreases and the gross area of the interfaces between the binder resin and the titanium oxide increases and, therefore, the visible ray reflectivity of the coat improves. It was found out, however, that if the content of titanium oxide is more than a certain content, a volume of titanium oxide is much larger than a volume of the binder resin, and the interfaces between the binder resin and the titanium oxide decreased conversely, and then the visible ray reflectivity declines.

The present invention has been achieved based on this knowledge.

According to the invention, the followings are provided:

(1) A precoated metal sheet for light reflectors, comprising a metal sheet or plated metal sheet, a visible light reflective coat provided on one surface of the metal sheet or plated metal sheet, and a heat absorptive coat provided on the other surface of the metal sheet or plated metal sheet, wherein the visible light reflective coat has a diffuse reflectance of visible rays of not less than 0.7 in a wavelength of 400 to 700 nanometers, and the heat absorptive coat has a total emissivity of infrared rays of not less than 0.7 in the range of wave number of 600 to 3000 cm$^{-1}$ measured at a certain temperature within the range of from 80 to 200 degrees centigrade.

(2) A precoated metal sheet for light reflectors according to (1) above, wherein the visible light reflective coat comprises a binder and a titanium oxide, a content of the titanium oxide being 40 to 250 parts by weight, based on 100 parts by weight of a solid content of the binder.

(3) A precoated metal sheet for light reflectors according to (1) or (2) above, wherein the binder in the visible light reflective coat comprises a fluororesin.

(4) A precoated metal sheet for light reflectors according to any one of (1) to (3) above, wherein the heat absorptive coat comprises a binder and a heat absorptive pigment, a content of the heat absorptive pigment being 10 to 150 parts by weight, based on 100 parts by weight of a solid content of the binder.

(5) A precoated metal sheet for light reflectors according to (4) above, wherein the heat absorptive pigment is a carbon.

(6) A precoated metal sheet for light reflectors according to (4) or (5) above, wherein the heat absorptive coat further comprises a conductive metal powder, a content of the conductive metal powder being from 1 to 50 parts by weight, based on 100 parts by weight of a solid content of the binder.

(7) A precoated metal sheet for light reflectors according to any one of (1) to (6) above, wherein the surface roughness Ra of the metal sheet or plated metal sheet is 0.05 to 1.8 micrometers.

(8) A precoated metal sheet for light reflectors according to any one of (1) to (7) above, wherein the metal sheet or plated metal sheet is preferably a steel sheet or a plated steel sheet.

(9) An electric or electronic apparatus comprising a precoated metal sheet for light reflectors according to any one of (1) to (8) above.

DETAILED DESCRIPTION OF THE INVENTION

Light of a fluorescent lamp or an electric bulb used as an illuminator and the light used for a light signal and the like are both visible rays. Therefore, if a diffuse reflectance of visible rays on the surface of a light reflector is more improved, light will become bright as a whole. A diffuse reflectance of visible rays varies with a substance of a light reflector surface. Aluminum, silver, titanium oxides, barium sulfate, zinc oxides, and the like are known as a substance having a high diffuse reflectance of visible rays. Therefore, a light reflector having a high reflectance is now made by using such technology, and it is thought that it is difficult to improve the reflectance.

On the other hand, an illuminator and a light signal-emitting instrument emit heat, which is an infrared radiation, as well as emitting light. Moreover, these instruments are mostly equipped with electronic components for controlling light brightness and other parts, and these electronic components generate heat.

The inventors found out that the light of an illumination or light signal becomes brighter when a precoated metal sheet coated with a high visible light reflectance coat on one side and a heat absorptive coat on the other side was used as a light reflector used for an illuminator or a light-signal-emitting instrument. Although the details of this reason are unknown, it seems that because heat (infrared radiation) generated from an illuminator or light signal-emitting instrument is probably absorbed by the heat absorptive coat, the luminous body acts in order to compensate this, and the quantity of visible light also increases, and it becomes bright. Moreover, in addition to these phenomena, when heat is absorbed by a precoated metal sheet of the present invention via a heat absorptive coat, the temperature of the precoated metal sheet rises, the temperature of the visible light reflective coat also rises, the refractive index of a binder resin in the visible light reflective coat becomes low, the refractive index difference between an added pigment, such as titanium oxides, and the binder resin becomes large, a visible ray reflectance of the visible light reflective coat improves, and the light of the illumination or light signal becomes brighter.

Figure 1:
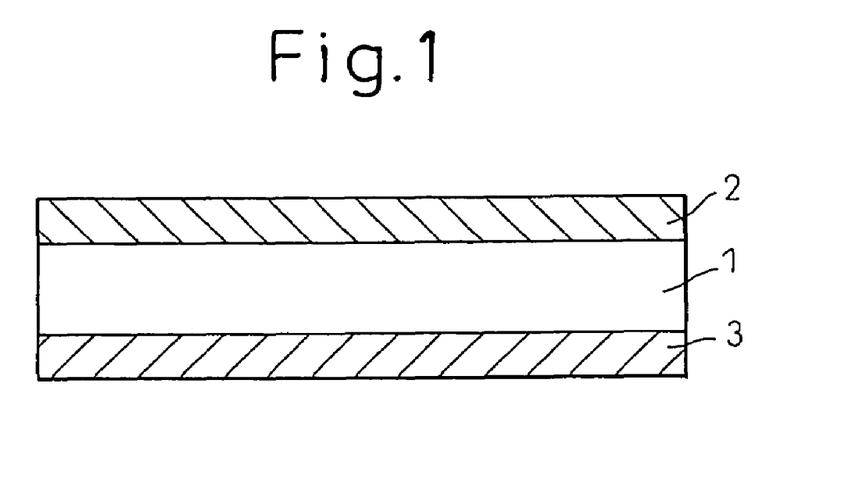
FIG. 1 is a schematic sectional view illustrating one embodiment of a precoated metal sheet according to the present invention.

Furthermore, it is also considered to be one of causes of the brightness improvement that the heat emitted out of the instrument is absorbed by the heat absorptive coat, the temperature in the instrument falls, electronic circuits of a control board and the like provided in the instrument work efficiently, the electric current loss spent on the light emission decreases, and the quantity of light increases. One embodiment of a precoated metal sheet for light reflectors excellent in heat absorptivity according to the present invention is illustrated in FIG. 1. It comprises a metal sheet 1, a visible light reflective coat 2 provided on one surface of the metal sheet 1, and a heat absorptive coat 3 provided on the other surface of the metal sheet 1.

A visible light reflective coat of the precoated metal sheet of the present invention must have a diffuse reflectance of visible rays of not less than 0.7 in the wavelength of 400 to 700 nanometers. A diffuse reflectance of visible rays of less than 0.7 is unsuitable because it does not improve a visible light reflective function and reduces the light from an illumination or a luminous body. Preferably, a diffuse reflectance of visible rays at 555 nanometers is not less than 0.8. This is because the wavelength range which, in particular, contributes to brightness in the wavelength range of visible rays is generally known to be from 550 to 555 nanometers. In the present invention, a diffuse reflectance is a spectral reflectance factor described in JIS Z 8722.2(2), and is also referred to as spectral reflectance. It can be measured according to JIS Z 8722.4. An increase of a diffuse reflectance of a visible light reflective coat is achieved by adding a visible light reflective pigment to the coat.

Publicly well-known pigments can be used as the visible light reflective pigment, examples of which include aluminum, silver, titanium oxide, barium sulfate, zinc oxide, and the like. Among them, titanium oxide is preferred when added in the coat. Because the refractive index of a titanium oxide is high, the diffuse reflection effect becomes higher when a titanium oxide is added in the coat.

A content of a titanium oxide is preferably 40 to 250 parts by weight based on 100 parts by weight of a solid content of a binder in the coat. The titanium oxide content of less than 40 parts by weight is not preferable because a visible light reflection function does not improve. The titanium oxide content of more than 250 parts by weight is also not preferable because there are faults such as thickening or gelling of a coating material of the coat. The titanium oxide content is more preferably 65 to 150 parts by weight. However, it is necessary to select the titanium oxide content suitably because a specific gravity of a resin varies with types of the binder resin, and a range of optimum content of a titanium oxide also varies a little.

Publicly known titanium oxides can be used as a titanium oxide used in the present invention. Examples of a titanium oxide include "TIPAQUE™" by Ishihara Sangyo Kaisha, Ltd., and "TITANIX™" by Tayca Corp. However, there are a rutile type and an anatase type among publicly known titanium oxides, and a rutile type is preferably used for the present invention. An anatase type has a possibility of decomposing a binder of the coat, because it has larger photocatalysis than a rutile type does. A surface of a titanium oxide may be treated with Al, Si, Zr, organic substances, or the like for purposes of reducing photocatalysis, improving a pigment dispersibility, or improving a weather resistance of a pigment.

As for a thickness of the visible light reflective coat, a thicker one is preferred because it improves a visible light reflectance, but a too thick coat is not preferable because it reduces the coating workability. Because an optimum thickness varies also with types of coating material binder, it cannot generally be specified, but the thickness is preferably 10 to 50 micrometers.

A total emissivity of the heat absorptive coat in the range of wave number of 600 to 3,000 $cm^{-1}$ measured at a certain temperature within the range of from 80 to 200 degrees centigrade is not less than 0.70. Because rays having a wave number of less than 600 $cm^{-1}$ or more than 3,000 $cm^{-1}$ have a very small influence on heat, an emissivity including rays having such a wave number is inappropriate. Moreover, a heat absorptive function declines when the total emissivity is less than 0.7.

Hereinafter, common knowledge about heat absorption is described. It is known that heat is a part of electromagnetic radiations emitted from an object and that when heat radiation rays enter an object, a part of them reflects, a part of them transmits, and the remaining part of them is absorbed. See, for example, Nishikawa and Fujita, "Mechanical-engineering basic lecture; Electrothermics" published by Rikogakusha Publishing Co., Ltd. When heat radiation rays go into a metal sheet, because heat radiation rays scarcely pass through the metal sheet, the heat radiation rays either reflect or are absorbed. When heat radiation rays generated from an illuminator or a light signal-emitting instrument go into a light reflector surface, if most of heat radiation rays incident on the surface reflect, the temperature of the instrument will rise, and on the other hand, if most of heat radiation rays are absorbed on the light reflector surface, the temperature of the instrument will fall.

A reflection method using an infrared spectrophotometer is well known as a method of examining the reflectance of heat radiation rays incident to a surface of a metal sheet and the like. When the reflectance is measured by this method, however, if the roughness on a surface of a metal sheet is coarse, the incident heat radiation rays will reflect diffusively and, therefore, it is difficult to obtain a highly precise absorption coefficient. According to Kirchhoff's law on heat radiation, at a constant temperature, an absorptivity and an emissivity of an object are the same. See, for example, Nishikawa and Fujita, "Mechanical-engineering basic lecture; Electrothermics" published by Rikogakusha Publishing Co., Ltd.

Furthermore, the inventors found out that it is preferred that the heat absorptive coat comprises 10 to 150 parts by weight of a heat absorptive pigment, based on 100 parts by weight of a solid content of the binder of the coat, in order to improve the emissivity of the heat absorptive coat. A heat absorptive pigment content of less than 10 parts by weight is not preferable because the emissivity tends to become less than 0.7. A heat absorptive pigment content of more than 150 parts by weight is also not preferable because a storage stability of a coating material of the coat is bad.

Publicly known heat absorptive pigments can be used as the heat absorptive pigment, examples of which include aniline black, polymethylene dyes, tris azo dye amine salts, cyanine dyes or metal complexes thereof, anthraquinone-based pigments, phthalocyanine-based pigments, iron oxides, carbons, and the like. Among these publicly known heat absorptive pigments, carbon is preferred because it radiates infrared rays in a broad range of wave number.

Publicly known carbons, such as carbon black, charcoal, graphite, can be used as the carbon. A carbon to be added is preferably a mixture of a carbon having a particle size of less than 0.1 micrometers (hereinafter referred to as "a small particle size carbon") and a carbon having a particle size of from 0.1 (inclusive) to 30 (exclusive) micrometers (hereinafter referred to as "a large particle size carbon"). A content of the small particle size carbon is preferably from 1 to 20 parts by weight, and a content of the large particle size carbon is preferably from 1 to 140 parts by weight, and a total content of the small and large particle size carbons is preferably 10 to 150 parts by weight, based on 100 parts by weight of a solid content of the binder. Although a minimum particle size of the small particle size carbon is not limited, it is not preferable that a maximum particle size thereof is not less than 0.1 micrometer because interstices between carbon particles tend to be formed and it becomes difficult to play the role of a small particle size carbon. It is not preferable that a content of the small particle size carbon is less than 1 part by weight because there is a possibility of an inferior effect for opacifying the metal sheet and of an inferior heat absorptivity. It is also not preferable that a content thereof is more than 20 parts by weight because there is a possibility that a viscosity of the coating liquid may become high or the coating liquid may be gelled as time passes. It is not preferable that the large particle size carbon has a particle size of less than 0.1 micrometer because it does not play a role as a large particle size carbon and it behaves in the same manner as a small particle size carbon does. It is not preferable that the large particle size carbon has a particle size of not less than 30 micrometers because there is a possibility that applicability may decline when applying a coating liquid comprising such a carbon or the appearance of a coat after coating becomes bad. It is not preferable that a content of the large particle size carbon is less than 1 part by weight because there is a possibility that a heat absorptivity may be inferior. It is also not preferable that a content thereof is more than 140 parts by weight because there is a possibility that the coat may become weak and the workability of the coat may be inferior. Furthermore, it is not preferable that a total content of the small and large particle size carbons is less than 10 parts by weight because there is a possibility of an inferior heat absorptivity. It is also not preferable that the total content is more than 150 parts by weight, because there is a possibility that the coat becomes weak and then the formability of the coat is inferior or there is a possibility that the coating liquid thickens and then the coating workability is inferior.

A thickness of the heat absorptive coat is not limited, but is preferably not less than 1 micrometer. It is not preferred that a thickness of the heat absorptive coat is less than 1 micrometer because the heat absorptivity may be inferior. Although a maximum thickness thereof is not limited, too much thickness tends to cause poor appearance, such as coating unevenness. Therefore, it is necessary to select the thickness suitably as required. Generally, the thickness is preferably less than 100 micrometers.

In addition to a heat absorptive pigment, the heat absorptive coat preferably comprises from 1 to 50 parts by weight of conductive metal powder, based on 100 parts by weight of the solid content of the binder, as a conductive pigment to make the precoated metal sheet conductive. It is preferable that the heat absorptive coat is conductive because the light reflector can secure grounding, and static electricity is hardly generated in the light reflector and, therefore, dust is hardly attached. It is not preferable that a content of the metal powder is less than 1 part by weight because the obtained conductivity is small. It is also not preferable that a content thereof is more than 50 parts by weight because the formability of the coat tends to decline. Examples of the conductive metal powder used include, but are not limited to, aluminum, nickel, stainless steels, copper, silver, magnesium, zinc, tin. The shape of metal powder is not limited, but must be selected suitably because the degree of conductivity may vary with shapes and some shapes hinder the heat absorptivity. As far as the inventors know, a combination of a flaky metal and a chain-form metal is more preferred. A chain-form metal is preferably used because an area reflecting heat in the coat becomes small and the heat absorption is hard to prevent. However, it is better to combine a chain-form metal with a flaky metal because there is a possibility that conductivity is inferior when using only a chain-form metal. A weight ratio of a flaky metal to a chain-form metal is preferably in the range between 0.1/1 and 6/1 because a heat absorptivity and conductivity are excellent. Because a flaky metal has a large area reflecting heat in the coat, there is a possibility of preventing heat absorption. Therefore, the conductivity is inferior when the weight ratio of a flaky metal to a chain-form metal may be less than 0.1/1. There is a possibility that the heat absorptivity may be inferior when the ratio is more than 6/1. Among metals, nickel is preferred because it hardly prevents heat absorption of a heat absorptive pigment, compared with other metals.

A binder constituting the visible light reflective coat or the heat absorptive coat may be a resin, or a publicly known coating binder for inorganic coats formed by a sol gel process, inorganic and organic composite coats formed by a sol gel process, or the like. It is preferred to use a resin in such a form as a coating material due to easy handling and simple method of coat formation. Publicly known resins can be used as the resin, examples of which include polyester resins, urethane resins, acrylic resins, epoxy resins, melamine resins, vinyl chloride resins, fluororesins, and the like. The resin may be either thermoplastic or thermosetting. Several types of these resins may be used together as required. Among these resins, a used resin is not limited, but is necessary to be selected suitably as required because the performances, such as workability, adhesion, and hardness, of the coat vary with the type, molecular weight, or glass transition temperature (Tg) of resins. When using a resin which is cured by a crosslinking agent, the performances, such as workability, adhesion, and hardness, of the coat vary with a type of a crosslinking agent and an addition amount thereof, and a type of a catalyst used in crosslinking reaction and an addition amount thereof, which are not limited but are necessary to be selected suitably as required. The resin may be solid, water-soluble, or water-dispersed emulsion. When a solid resin is used, it can be thermofused, dissolved in an organic solvent, or pulverized into powder in advance. Ultraviolet (UV) curable resins and electron beam (EB) curable resins may be also used. Any of these resins may be a commercially available one.

According to the knowledge which the inventors gained until now, solvent-based melamine-curable polyester binders, solvent-based isocyanate-curable polyester binders, and water-dispersed acrylic emulsion binders are preferred as the binder. Particularly preferred examples of the binder include, but are not limited to, the following.

As to a solvent-based melamine-curable polyester binder, a number average molecular weight of a polyester resin is preferably from 2,000 to 30,000, a Tg of a polyester resin is preferably from −10 to 70 degrees centigrade, and an addition amount of a melamine resin is preferably from 5 to 70 parts by weight based on 100 parts by weight of the polyester resin. It is not preferable that the molecular weight of the polyester resin is less than 2,000 because the workability of the coat declines. It is also not preferable that the molecular weight is more than 30,000 because a viscosity of a solution of the resin dissolved in a solvent is too high. It is not preferable that a Tg of the polyester resin is less than −10 degrees centigrade because a coat cannot be formed. It is also not preferable that the Tg is more than 70 degrees centigrade because the coat is too hard and the workability declines. It is not preferable that the addition amount of the melamine is less than 5 parts by weight, based on 100 parts by weight of the polyester resin, because the coat is uncured. It is also not preferable that the addition amount is more than 70 parts by weight because the coat is too hard and the workability declines. A polyester resin to be used may be a commercially available one, examples of which include "VYLON™" by Toyobo Co., Ltd. and "Desmophen™" by Sumitomo Bayer Urethane Co., Ltd. A melamine resin to be used may also be a commercially available one, examples of which include "CYMEL™" and "MYCOAT™" by Mitsui Cytec, Ltd., and "BECKHAMIN™" and "SUPERBECKHAMIN™" by Dainippon Ink & Chemicals, Inc.

As to a solvent-based isocyanate-curable polyester binder, a number average molecular weight of a polyester resin is preferably from 2,000 to 30,000, a Tg of a polyester resin is preferably from −10 to 70 degrees centigrade, and an addition amount of isocyanate is preferably such that a value of [NCO group of isocyanate in equivalents]/[OH group of polyester resin in equivalents] is from 0.8 to 1.2. When the value of [NCO group of isocyanate in equivalents]/[OH group of polyester resin in equivalents] is less than 0.8 or more than 1.2, the coat tends to be uncured when the coat is formed. It is not preferable that the molecular weight of the polyester resin is less than 2,000 because the workability of the coat declines. It is also not preferable that the molecular weight is more than 30,000 because a viscosity of a solution of the resin dissolved in a solvent is too high. It is not preferable that a Tg of the polyester resin is less than −10 degrees centigrade because a coat cannot be formed. It is also not preferable that a Tg of the polyester resin is more than 70 degrees centigrade because the coat is too hard and the workability declines. A polyester resin to be used may be a commercially available one, examples of which include "VYLON™" by Toyobo Co., Ltd. and "Desmophen™" by Sumitomo Bayer Urethane Co., Ltd. An isocyanate to be used may be also a commercially available one, examples of which include "Sumidur™" and "Desmodur™" by Sumitomo Bayer Urethane Co., Ltd., and "Takenate™" by Mitsui Takeda Chemicals, Inc.

A water-dispersed acrylic emulsion binder to be used may also be a publicly known one or a commercially available one. When a water-dispersed acrylic emulsion binder is used, a publicly known highly adhesive resin such as an epoxy resin may be added to the binder. The type and content of the epoxy resin can be selected suitably, if needed, because they have an influence on the performance of the coat. A water-based resin such as a water-dispersed acrylic resin is more preferable because the coating workability is high, there is no problem of releasing a volatile organic solvent into the atmosphere, and there are no need of a buildup of an exhaust duct and a combustion equipment of a volatile organic solvent in a coater.

When the visible light reflective pigment added in the visible light reflective coat of the precoated metal sheet according to the present invention is a titanium oxide, the binder resin in the visible light reflective coat preferably comprises a fluororesin because the reflectivity is improved. Because a fluororesin has a lower refractive index than any other publicly known resins, when a fluororesin is combined with a titanium oxide having a high refractive index, a refractive index difference between the binder resin and the titanium oxide pigment is large, and light reflects more easily on the interfaces between them.

A fluororesin to be used may be a publicly known one such as trifluoroethylene resins, tetrafluoroethylene resins, vinylidene fluoride resins, and the like. The resin may be a homopolymer or a copolymer with another resin monomer. A fluororesin blended with another resin may be used as a fluororesin-containing binder resin. However, a coat having a high fluorine concentration is preferable. It is more preferable that a trifluoroethylene resin is used because a fluorine concentration in the coat is high, and it is easy to prepare a coating material. In the present invention, a trifluoroethylene resin is defined as a resin comprising a poymer having a repeating unit —$CF_2$—CFX—, wherein X is hydrogen or a halogen other than fluorine. Examples of a trifluoroethylene resin include a poly(chlorotrifluoroethylene). The binder resin comprising a fluororesin may be a commercially available fluorine-based coating resin, examples of which include "Kynar™" series which are vinylidene fluoride homopolymers by ATOFINA Chemicals, Inc., and "LUMIFLON™" series which are copolymers of trifluoroethylene resin and another resin by Asahi Glass Co., Ltd. When a vinylidene fluoride homopolymer is used, it is commonly blended with an acrylic resin before use. These resins may be crosslinked, if needed, by a publicly known crosslinking agent such as isocyanate or a melamine resin. An isocyanate to be used may be a commercially available one, examples of which include "Sumidur™" and "Desmodur™" by Sumitomo Bayer Urethane Co., Ltd., and "Takenate™" by Mitsui Takeda Chemicals, Inc. A melamine resin to be used may be a commercially available one, examples of which include "Cymel™" and "MYCOAT™" by Mitsui Cytec, Ltd., and "BECKHAMIN™" and "SUPERBECKHAMIN™" by Dainippon Ink & Chemicals, Inc. It is not necessary to use a crosslinking agent. It is preferable that an amount of a crosslinking agent added is not more than 20 parts by weight based on 100 parts by weight of the total resins including a fluororesin because a fluorine concentration in the coat becomes higher and the visible light diffuse reflectance is also improved. It is more preferred that a trifluoroethylene resin having a hydroxyl value of not more than 10 mg-KOH/g is used and an amount of a crosslinking agent added is not more than 20 parts by weight, based on 100 parts by weight of the total resins including the trifluoroethylene resin, because the diffuse reflectance of visible rays is improved. This is because, when the hydroxyl value is not more than 10 mg-KOH/g, the coat is crosslinked by a small amount of crosslinking agent, or the coat is formed even if a crosslinking agent is not used, and a fluorine concentration in the coat becomes high.

The visible light reflective coat or heat absorptive coat can further comprise a color pigment, a rust preventing pigment, or a rust preventive, if necessary, in addition to a titanium oxide, a heat absorptive pigment, and a conductive pigment. However, when trying to more improve a visible light reflectance of the visible light reflective coat, a coat consisting only of a binder resin and a titanium oxide is more preferable because the diffuse reflectance of visible light is improved. If a pigment other than a titanium oxide is added in the visible light reflective coat, interfaces having a small difference of refractive index will occur between a binder resin and a pigment other than a titanium oxide, and a visible light diffuse reflectance of the coat declines. However, from a standpoint of appearance or corrosion protection, if necessary, a pigment other than a titanium oxide may be added to the visible light reflective coat.

Publicly known inorganic or organic color pigments are used as the color pigment. Examples of inorganic color pigments include zinc oxide (ZnO), zirconium oxide ($ZrO_2$), calcium carbonate ($CaCO_3$), barium sulfate ($BaSO_4$), alumina ($Al_2O_3$), kaolin clay, and iron oxides ($Fe_2O_3$, $Fe_3O_4$).

Examples of the rust preventing pigment or rust preventive include publicly known chromium-containing rust preventive pigments such as strontium chromate and calcium chromate, and publicly known chromium-free rust preventing pigments or rust preventives such as zinc phosphate, zinc phosphite, aluminum phosphate, aluminum phosphite, molybdates, phosphate/molybdate salts, vanadate/phosphate mixture pigments, silica, and Ca-adsorbed silicas called calcium silicates. When a base metal of the precoated metal sheet is an easily corrosive metal such as a steel sheet or a plated steel sheet, it is preferable that a rust preventing pigment or rust preventive is added in order to improve the corrosion resistance of the precoated metal sheet. Chromium-free rust preventing pigments or rust preventives are more effective if an environmental problem in recent years is considered. As a chromium-free rust preventing pigment or rust preventive, either a reagent or a commercially available one may be used. Examples of commercially available rust preventing pigments include zinc phosphate-based rust preventing pigments "EXPERT™-NP500" and "EXPERT™-NP530" by Toho Ganryo Co., Ltd., zinc phosphite-based rust preventing pigments "EXPERT™-NP1500", "EXPERT™-NP1530", "EXPERT™-NP1600" and "EXPERT™-NP1700" by Toho Ganryo Co., Ltd., aluminum triphosphates "K-WHITE" series by Tayca Corporation, molybdate-based pigments or phosphate/molybdate-based pigments "SHER-WHITE" series by the Sherwin-Williams Company, fumed silicas "AEROSIL™" series by Nippon Aerosil Co., Ltd. or Degussa Japan Co., Ltd., colloidal silicas "SNOWTEX™" series by Nissan Chemical Industries, Ltd., calcium ion adsorbed silicas "SHIELDEX™" series by GRACE, and the like. Two or more of these rust preventing pigments can be used in combination. Among these chromium-free rust preventing pigments, a calcium ion adsorbed silica alone or a combination of a calcium ion adsorbed silica and a phosphate-based rust preventing pigment is preferred because it is excellent in corrosion resistance and press-formability on the precoated metal sheet. A combination of a calcium ion adsorbed silica and aluminum triphosphate is more preferred.

It is necessary to suitably select a type, an addition amount, and a particle size of these color pigments, rust preventing pigments, or rust preventives as required because the coat performances, such as an emissivity, workability, appearance, and corrosion resistance, vary with them.

Publicly known additives such as leveling agents, pigment dispersants, waxes, delustering agents, and the like can be added, if necessary, to the heat absorptive coat. However, the visible light reflective coat preferably does not comprise such an additive because such an additive reduces the diffuse reflectance of visible lights. However, if necessary for the coating workability or the coat performances, such an additive may be added also to the visible light reflective coat. The type or content of the additive is not limited, and can be selected suitably as required. In particular, a wax is effective in improving the formability of the precoated metal sheet, and in preventing the heat absorptive coat from cracking, and the like.

A low visible light regular reflectance of a light reflector is sometimes preferred, depending on applications of a precoated metal sheet for light reflectors of the present invention. If the regular reflectance of a light reflector is high, the reflected light does not diffuse and only a specific part becomes bright, or the image of the light source, such as an electric bulb and a fluorescent lamp, is reflected on the light reflector surface. In a light reflector of a liquid crystal television set, for example, unless light is diffuse-reflected more uniformly and transmitted to a liquid crystal display, there is a possibility that the light and shade of brightness may occur in an image in a liquid crystal display. Light reflectors for such an application sometimes require a low regular reflectance of visible lights. It is known that a regular reflectance of visible lights has a negative correlation with a gloss of a surface of the visible light reflective coat, and that the lower the gloss is, the lower the regular reflectance becomes. Therefore, one preferred means of reducing the visible light regular reflectance of the visible light reflective coat is the addition of a delustering agent to the visible light reflective coat. The delustering agent to be used may be a publicly known delustering agent, and silicas or silica-based pigments are effective. Among silica-based pigments, a metal ion adsorbed silica is preferred because it also improves the corrosion resistance. Publicly known silicas can be used as silica for the delustering agent. Examples thereof include fumed silicas "AEROSIL™" series by Nippon Aerosil Co., Ltd. or Degussa Japan Co., Ltd., colloidal silicas "SNOWTEX™" series by Nissan Chemical Industries, Ltd. and the like. Calcium ion adsorbed silicas "SHIELDEX™" series by GRACE can be used as the metal ion adsorbed silica. However, unless a low regular reflectance of visible light or a low gloss is demanded, it is preferred that the visible light reflective coat does not comprise a delustering agent and the like and consists only of a binder resin and a titanium oxide because the diffuse reflectance is higher than when it comprises a delustering agent.

In order to form a visible light reflective coat and a heat absorptive coat on a surface of the metal sheet, the metal sheet can be coated with components, including a binder, of the coat in a publicly known form of a coating material. Examples of the form include solvent-based coating materials in which a resin is dissolved in a solvent, aqueous coating materials in which an emulsified resin is dispersed in water and the like, powder coating materials obtained by pulverizing a resin into a powder, slurry powder coating materials in which a pulverized resin is dispersed in water and the like, ultraviolet (UV) curable coating materials, electron beam (EB) curable coating materials, film lamination in which a resin is formed into a film shape and the film is laminated, and melt coating in which a resin is melted and applied. Examples of a coating method include, but are not limited to, roll coating, roller curtain coating, curtain flow coating, air spray coating, airless spray coating, brush coating, die coater coating, and other publicly known coating methods. Among them, roll coating, roller curtain coating, curtain flow coating, and die coater coating are preferred because continuous process is possible and production efficiency is improved.

A primer coat may be provided under the visible light reflective coat or the heat absorptive coat for the purpose of rust proofing or masking. Publicly known binders, rust preventing pigments, and color pigments can be used for the primer coat. Commercially available coating materials may be used for the primer coat. The same binders, rust preventing pigments, and color pigments as the above-mentioned ones used for the visible light reflective coat or heat absorptive coat may be used. A primer coat under the visible light reflective coat preferably comprises 40 to 250 parts by weight of a visible light reflective pigment, preferably a titanium oxide, based on 100 parts by weight of the solid content of the binder because the diffuse reflectance of the visible light reflective coat is improved. A thickness of the primer coat is preferably, but is not limited to, from 1 to 40 micrometers. When the thickness is less than 1 micrometer, there is a possibility that the primer coat does not play a role such as masking or corrosion resistance. When the thickness is more than 40 micrometers, there is a possibility that the coating workability declines. The same binder resins as those used for the visible light reflective coat or the heat absorptive coat can be used for the primer coat. Moreover, publicly known additives such as color pigments, rust preventing pigments, leveling agents, pigment dispersants, waxes, delustering agents, and the like can be added, if necessary, to the primer coat as well as to the visible light reflective coat or the heat absorptive coat. In particular, the addition of a rust preventing pigment to the primer coat is preferred because it improves the corrosion resistance of the precoated metal sheet. A chromium-free rust preventing pigment is preferably used. Among chromium-free rust preventing pigments, a calcium ion adsorbed silica alone or a combination of a calcium ion adsorbed silica and a phosphate-based rust preventing pigment is preferred because it is excellent in corrosion resistance and press-formability of the precoated metal sheet. A combination of a calcium ion adsorbed silica and aluminum triphosphate is more preferred. When a primer coat is provided under the visible light reflective coat, a delustering agent is preferably added in the primer coat in order to reduce a visible light regular reflectance of the visible light reflective coat. Publicly known delustering agents can be used as a delustering agent in the primer coat, and silica-based delustering agents and the like are well-known.

In addition, a surface of the metal sheet is preferably pretreated before coating the visible light reflective coat or the heat absorptive coat in order to increase the coat adhesion. Examples of such a pretreatment include chromate coating treatment, electrolytic chromate treatment, zinc phosphate treatment, zirconia-based treatment, titania-based treatment, and other publicly known treatment. Non-chromate pretreatment using an organic compound such as a resin, which has been developed in recent years, is preferred because the load on the environment is reduced. Examples of non-chromate pretreatment using an organic compound such as a resin include treatments described in Japanese Unexamined Patent Publications No. Hei 09-828291, No. Hei 10-251509, No. Hei 10-337530, No. 2000-17466, No. 2000-248385, No. 2000-273659, No. 2000-282252, No. 2000-265282, No. 2000-167482, or No. 2002-266081, and other publicly known treatments. A commercially available chromate treatment may be used. A type and coating weight of the pretreatment need to be suitably selected, if necessary, because the adhesion of the heat absorptive coat and the corrosion resistance of the precoated metal sheet vary greatly with the type or coating weight.

Publicly known materials can be used as a base metal of the metal sheet of the precoated metal sheet according to the present invention. The base metal may be an alloy. Examples of the metal sheet include steel sheets, aluminum sheets, titanium sheets, copper sheets, and the like. A surface of the metal sheet may be plated, for example, with zinc, aluminum, copper, or nickel, as well as alloys. Examples of a steel sheet used as the metal sheet include cold rolled sheet steels, hot rolled sheet steels, hot dip zinc coated steel sheets, electro-galvanized steel sheet, hot dip alloyed galvanized steel sheets, aluminum-plated steel sheets, aluminum-zinc alloyed plated steel sheets, stainless steel sheets, and other publicly known steel sheets and plated steel sheets.

A surface roughness Ra of the metal sheet or plated metal sheet is preferably 0.05 to 1.8 micrometers because the diffuse reflectance is improved. When visible rays go into a surface of the visible light reflective coat, visible rays transmitting the visible light reflective coat without reflected are reflected on a surface of the base metal sheet under the coat. The inventors found that, when the surface roughness of the base metal sheet was much smaller than the visible ray wavelengths (the wavelength region of visible rays is usually said to be 380 to 780 nanometers), visible rays incident on the base metal surface are hardly diffuse-reflected but are easily regular-reflected. On the other hand, when the surface roughness of the base metal sheet is much larger than the wavelengths of visible rays, visible rays incident on the base metal surface enter the interstices between the unevenness on the surface of a base metal and are easily absorbed by the base metal. Therefore, it is not preferable that a surface roughness Ra of the metal sheet or plated metal sheet which is the base metal is less than 0.05 micrometers because it is hard to diffuse-reflect visible rays. It is also not preferable that the Ra is more than 1.8 micrometers because visible rays passing the visible light reflective coat without reflected and reaching the metal sheet or plated metal sheet which is a base metal are easy to absorb by the base metal surface.

The metal sheet may be subjected to an usual treatment, such as hot water rinsing, alkaline degreasing, and acid pickling, prior to performing the before-coating pretreatment. A sheet steel or plated steel sheet is preferably used as the metal sheet because the forming workability of the precoated metal sheet is improved.

A reflector production efficiency improves if the reflector is produced by forming a precoated metal sheet of the present invention. A reflector can be produced by a publicly known forming method, examples of which include blanking, bending, deep drawing, stretch forming, roll forming, and other forming methods.

In an electric or electronic apparatus comprising a precoated metal sheet according to the present invention, because the precoated metal sheet has a high diffuse reflectance of visible rays as well as an excellent heat absorptivity, the light of illumination or light signal become brighter and the temperature in the apparatus declines and, therefore, electronic circuits of a control board and the like provided in the apparatus can work efficiently and stably. Examples of the electric or electronic apparatus include illuminators, audio-visual equipment, mobile computing devices, plasma displays, liquid crystal television sets.

EXAMPLES

The methods of preparing heat absorptive coating materials and visible light reflective coating materials used in the experiments will be explained in detail below.

A commercially available organic solvent soluble amorphous polyester resin "VYLON™ GK140" having a number average molecular weight of 13,000 and a Tg of 20 degrees centigrade by Toyobo Co., Ltd. (hereinafter referred to as the polyester resin) was dissolved in an organic solvent consisting of 50 percent by weight of Solvesso™ 150 and 50 percent by weight of cyclohexanone.

Subsequently, 15 parts by weight of a commercially available hexamethoxymethylmelamine "CYMEL™ 303" by Mitsui Cytec, Ltd. and 0.5 parts by weight of a commercially available acid catalyst "Catalyst 6003B" by Mitsui Cytec, Ltd., based on 100 parts by weight of the solid content of the polyester resin, were added to the polyester resin dissolved in the organic solvent. The resultant mixture was agitated to obtain a melamine curable polyester-based clear coating material, which is hereinafter referred to as the polyester/melamine-based coating material.

In order to examine the effect of resins, the above-mentioned polyester resin dissolved in the organic solvent was blended with a commercially available HDI (hexamethylene diisocyanate)-based blocking isocyanate "Sumidur™ BL3175" by Sumitomo Bayer Urethane Co., Ltd. at a value [NCO group of isocyanate in equivalents]/[OH group of polyester resin in equivalents] of 1.0, and further 0.05 parts by weight of a reaction catalyst "TK-1" by Mitsui Takeda Chemicals, Inc., based on 100 parts by weight of the solid content of the resin, was added to obtain an isocyanate curable polyester-based clear coating material, which is hereinafter referred to as the polyester/isocyanate-based coating material.

In order to further examine the effect of resins, a commercially available trifluoroethylene-based resin "LUMI-FLON™ LF552" having a number average molecular weight of 12,000 and a Tg of 20 degrees centigrade by Asahi Glass Co., Ltd. was blended with a commercially available HDI (hexamethylene diisocyanate)-based blocking isocyanate "Sumidur™ BL3175" by Sumitomo Bayer Urethane Co., Ltd. at a value [NCO group of isocyanate in equivalents]/[OH group of polyester resin in equivalents] of 1.0, and further 0.05 parts by weight of a reaction catalyst "TK-1" by Mitsui Takeda Chemicals, Inc., based on 100 parts by weight of the solid content of the resin, was added to obtain a fluorine-based clear coating material, which is hereinafter referred to as the fluorine-based coating material.

Subsequently, various pigments were added to the obtained clear coating materials to prepare visible light reflective coating materials, heat absorptive coating materials, and primer coating materials.

The details of the prepared coating materials are described below.

[Visible Light Reflective Coating Materials]

A titanium oxide "TIPAQUE CR95" by Ishihara Sangyo Kaisha, Ltd. was added to the clear coating materials and was agitated to obtain visible light reflective coating materials, which are sometimes referred to simply as "reflective coating materials." The details of types of used clear coating materials and the content of the titanium oxide are shown in Table 1. The content of the titanium oxide in Table 1 is expressed by parts by weight of the titanium oxide based on 100 parts by weight of the resin solid content of the clear coating material.

TABLE 1

| Coating Material No. | Coating Material | Content of Titanium Oxide | Note |
|---|---|---|---|
| Reflective-I-1 | polyester/isocyanate-based | 120 | — |
| Reflective-I-2 | polyester/melamine-based | 120 | — |
| Reflective-I-3 | polyester/melamine-based | 65 | — |
| Reflective-I-4 | polyester/melamine-based | 30 | — |
| Reflective-I-5 | polyester/melamine-based | 300 | a) |
| Reflective-I-6 | fluorine-based | 100 | — |

Note:
a) Coating was difficult due to thickening of coating material.

[Heat Absorptive Coating Materials]

Heat absorptive coating materials were obtained by adding a carbon to the clear coating materials and agitating them.

In this experiment, a carbon black "TOKABLACK #7350F" by Tokai Carbon Co., Ltd. was used as the small particle size carbon. "Bincho Charcoal Powder" having a maximum particle diameter of 5 micrometers sold by Cooperative Association LATEST and a carbon having an average particle diameter to 20 micrometers obtained by pulverizing a commercially available reagent graphite and classifying with a sieve were used as the large particle size carbon. A conductive pigment consisting of a mixture of 6 parts by weight of a commercially available flaky metal nickel and 1 part by weight of a commercially available chain-form metal nickel was added when necessary.

The details of the prepared heat absorptive coating materials are shown in Table 2. The contents of these additives in Table 2 are expressed by parts by weight of the additive based on 100 parts by weight of the resin solid content of the clear coating material.

The following metal sheets were used in this experiment. Roughnesses of these metal sheets were adjusted by rolling the metal sheets with a reduction roll in order to make the roughnesses of the metal sheets almost the same.

EG: a commercially available electrogalvanized steel sheet (Electroplated zinc weight: 20 $g/m^2$ on one side, Material: SECE (JIS G3313)), Surface roughness Ra: 0.9 micrometers)

AL sheet: a commercially available aluminum plated steel sheet (Aluminum coating weight: 60 $g/m^2$ on one side, Material: SALE (JIS G3314), Surface roughness Ra: 1.0 micrometer)

GL: a commercially available 55 percent aluminum-zinc plated steel sheet (Plating weight: 90 $g/m^2$ on one side, Material: SGLCD (JIS G3321), Surface roughness Ra: 0.9 micrometers)

Aluminum sheet: a commercially available aluminum sheet (Material: 1100 (JIS H4000), Surface roughness Ra: 0.8 micrometers)

A commercially available chromate treatment "ZMI1300AN" by Nihon Parkerizing Co., Ltd. (hereinafter

TABLE 2

| Coating Material No. | Coating Material | Small Particle Size Carbon | Large Particle Size Carbon | Conductive Pigment | Note |
|---|---|---|---|---|---|
| Heat Adsorptive-I-1 | polyester/isocyanate-based | 15 | — | — | — |
| Heat Adsorptive-I-2 | polyester/melamine-based | 15 | — | — | — |
| Heat Adsorptive-I-3 | polyester/melamine-based | 50 | — | — | a) |
| Heat Adsorptive-I-4 | polyester/melamine-based | 100 | — | — | a) |
| Heat Adsorptive-I-5 | polyester/melamine-based | 150 | — | — | a) |
| Heat Adsorptive-I-6 | polyester/melamine-based | 0 | 50 | — | — |
| Heat Adsorptive-I-7 | polyester/melamine-based | 5 | 45 | — | — |
| Heat Adsorptive-I-8 | polyester/melamine-based | 15 | 35 | — | — |
| Heat Adsorptive-I-9 | polyester/melamine-based | 15 | — | 5 | — |
| Heat Adsorptive-I-10 | polyester/melamine-based | 15 | — | 50 | — |
| Heat Adsorptive-I-11 | polyester/melamine-based | 5 | — | — | — |
| Heat Adsorptive-I-12 | polyester/melamine-based | 250 | — | — | b) |
| Heat Adsorptive-I-13 | polyester/melamine-based | 10 | 240 | — | b) |

Note:
a) Coating applicability was bad due to thickening of coating material.
b) Coating was difficult due to thickening of coating material.

[Primer Coating Materials]

Chromate-free primer coating materials were prepared by adding 20 parts by weight of chromate-free rust preventing pigment "SHIELDEX C303" by GRACE and 40 parts by weight of titanium oxide "TIPAQUE™ CR95" by Ishihara Sangyo Kaisha, Ltd. as a visible light reflective pigment, based on 100 parts by weight of the solid content of the resin, to a polyester-based clear coating material FLC641 by Nippon Paint Co., Ltd. and then agitating the resultant mixture. Moreover, the FLC641EU primer which is a polyester-based primer coating material sold by Nippon Paint Co., Ltd. was also used as a commercially available chromate-based primer.

The method for preparing a precoated metal sheet used in the experiment will be explained in detail below.

A metal sheet having a thickness of 0.6 millimeters was alkali-degreased at 60 degrees centigrade in an aqueous solution containing 2 percent by weight of a commercially available alkali degreasing agent "FC4336" by Nihon Parkerizing Co., Ltd., and then was rinsed with water and dried. Subsequently, a conversion treatment liquid was applied on the degreased metal sheet using a roll coater, and then the sheet was dried with hot air at a peak metal temperature of 60 degrees centigrade.

referred to as the chromate treatment) and a commercially available non-chromate conversion treatment "CT-E300" by Nihon Parkerizing Co., Ltd. (hereinafter referred to as the non-chromate treatment) were used as a conversion treatment in this experiment. Both surfaces of a metal sheet were conversion-treated with a roll coater, and then were dried at a peak metal temperature of 60 degrees centigrade. The coating weight of the chromate treatment was 50 milligrams of Cr per square meter. The coating weight of the non-chromate treatment was 150 milligrams of the total coating weight per square meter.

Subsequently, the primer coating material was applied on one surface of the conversion-treated metal sheet, and the heat absorptive coating material described in Table 2 was applied on the other surface with a roll coater, and then dried and cured at a peak metal temperature (PMT) of 210 degrees centigrade in an induction heating furnace using hot air in combination. Subsequently, the visible light reflective coating material described in Table 1 was applied on the surface coated with the primer coating material by a roller curtain coater, and then dried and cured at a peak metal temperature (PMT) of 230 degrees centigrade in an induction heating furnace using hot air in combination. Precoated metal sheets without a primer coat were also prepared as required. The thickness of the primer coat was 10 micrometers when dried, the thickness of the visible light reflective coat was 20 micrometers when dried, and the thickness of the heat absorptive coat was 5 micrometers when dried. The details of the precoated metal sheets (PCM) prepared are shown in Table 3.

TABLE 3

| PCM No. | Metal sheet | Conversion treatment | Coating material for visible light reflective coat side | | Coating material for heat adsorptive coat side |
|---|---|---|---|---|---|
| | | | Primer coat | Top coat | Top coat |
| PCM-I-1 | EG | Non-chromate | Chromate-free | Reflective-I-1 | Heat Adsorptive-I-2 |
| PCM-I-2 | EG | Non-chromate | Chromate-free | Reflective-I-2 | Heat Adsorptive-I-2 |
| PCM-I-3 | EG | Non-chromate | Chromate-free | Reflective-I-3 | Heat Adsorptive-I-2 |
| PCM-I-4 | EG | Non-chromate | Chromate-free | Reflective-I-2 | Heat Adsorptive-I-1 |
| PCM-I-5 | EG | Non-chromate | Chromate-free | Reflective-I-2 | Heat Adsorptive-I-3 |
| PCM-I-6 | EG | Non-chromate | Chromate-free | Reflective-I-2 | Heat Adsorptive-I-4 |
| PCM-I-7 | EG | Non-chromate | Chromate-free | Reflective-I-2 | Heat Adsorptive-I-5 |
| PCM-I-8 | EG | Non-chromate | Chromate-free | Reflective-I-2 | Heat Adsorptive-I-6 |
| PCM-I-9 | EG | Non-chromate | Chromate-free | Reflective-I-2 | Heat Adsorptive-I-7 |
| PCM-I-10 | EG | Non-chromate | Chromate-free | Reflective-I-2 | Heat Adsorptive-I-8 |
| PCM-I-11 | EG | Non-chromate | Chromate-free | Reflective-I-2 | Heat Adsorptive-I-9 |
| PCM-I-12 | EG | Non-chromate | Chromate-free | Reflective-I-2 | Heat Adsorptive-I-10 |
| PCM-I-13 | EG | Non-chromate | Reflective-I-2 | Reflective-I-2 | Heat Adsorptive-I-2 |
| PCM-I-14 | EG | Chromate | Chromate-based | Reflective-I-2 | Heat Adsorptive-I-2 |
| PCM-I-15 | EG | Non-chromate | Chromate-free | Reflective-I-2 | Heat Adsorptive-I-2 |
| PCM-I-16 | AL sheet | Non-chromate | Chromate-free | Reflective-I-2 | Heat Adsorptive-I-2 |
| PCM-I-17 | GL | Non-chromate | Chromate-free | Reflective-I-2 | Heat Adsorptive-I-2 |
| PCM-I-18 | Aluminum sheet | Non-chromate | Chromate-free | Reflective-I-2 | Heat Adsorptive-I-2 |
| PCM-I-19 | EG | Non-chromate | Chromate-free | Reflective-I-6 | Heat Adsorptive-I-2 |
| PCM-I-20 | EG | Non-chromate | Chromate-free | Reflective-I-4 | Heat Adsorptive-I-2 |
| PCM-I-21 | EG | Non-chromate | Chromate-free | Reflective-I-2 | Heat Adsorptive-I-11 |

Test methods for evaluating the precoated metal sheets prepared will be explained in details below.

1) Visible Ray Diffuse Reflectance of Visible Light Reflective Coat

Visible ray diffuse reflectance of a visible light reflective coat surface of the prepared precoated metal sheet was measured in a wavelength range of from 400 to 700 nanometers using a spectrophotometer "UV265" by Shimadzu Corp. with an integrating sphere reflective attachment being additionally attached, and the integral value of the obtained wavelength-reflectance curve was determined. Moreover, a visible ray diffuse reflectance in the wavelength of 555 nanometers which contributes to brightness most was also measured. A reference used was barium sulfate made by Merck & Co., Inc. which is a white specimen according to German DIN standard (DIN5033), and the diffuse reflectance of each coat was determined when the diffuse reflectance of the reference was defined as 1.00.

2) Gloss Of Visible Light Reflective Coat

A specular gloss of a visible light reflective coat surface of a precoated metal sheet was measured at an incidence angle of 60 degrees and an acceptance angle of 60 degrees according to JIS K 5400.7.6.

3) Emissivity of Metal Sheet at Heat Absorptive Coat Side

An infrared emission spectrum of the prepared precoated metal sheet was measured in a wave number range of from 600 to 3000 $cm^{-1}$ at a sheet temperature of 80 degrees centigrade using a Fourier transform infrared spectrophotometer "VALOR-III" by Jasco Corp., and was compared with an emission spectrum of a standard black body to determine a total emissivity of the metal sheet. In this connection, an iron sheet which was spray-coated with "THI-1B Black Spray" manufactured by Okitsumo Inc. and sold by Tasco Japan Inc. at a coat thickness of 30±2 micrometers was used as the standard black body. The emissivity was measured on the heat absorptive coat surface of the precoated metal sheet prepared.

4) Illumination Of Illuminator

Figure 2:
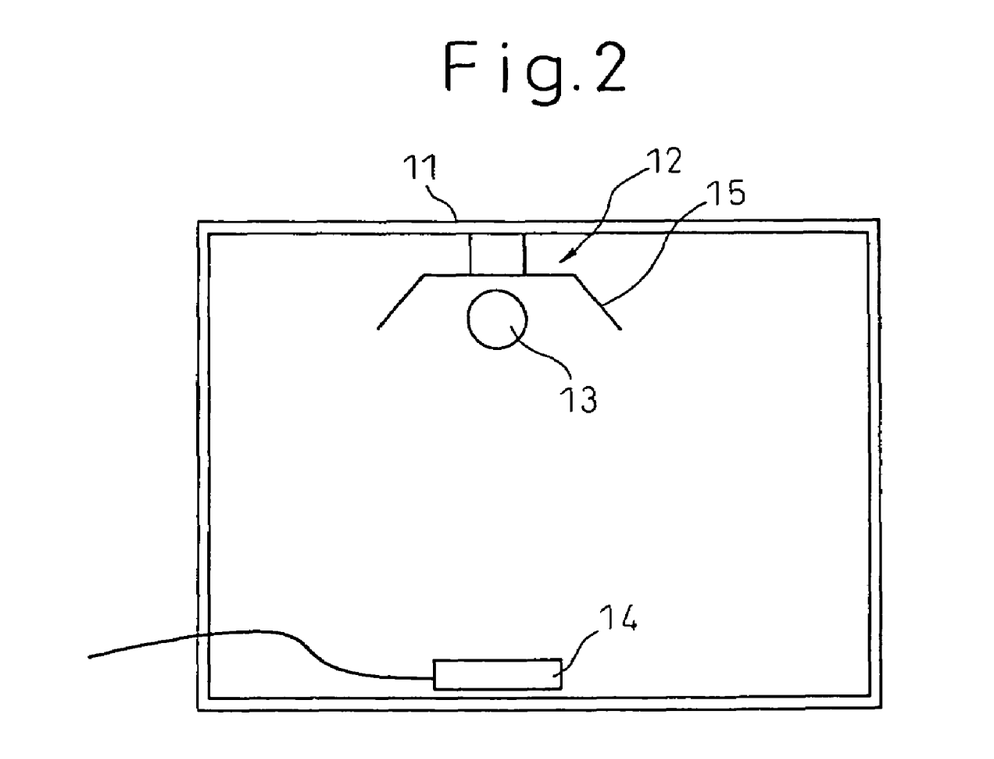
FIG. 2 is a sketch of an instrument for measuring illumination.

A sketch of an instrument used for measuring illumination is shown in FIG. 2. A commercially available fluorescent illuminator 12 was attached in a wooden case 11. A sensor 14 of a commercially available illuminometer was placed at a distance of 30 centimeters from a fluorescent lamp 13, and then illumination was measured. An light reflector 15 originally attached to the fluorescent illuminator 12 (hereinafter referred to as the conventional light reflector) was removed. A light reflector 15 having the same shape as that of the conventional light reflector 15 was formed using each of the prepared precoated metal sheets. Illuminations were measured when each formed light reflector 15 was attached to the illuminator 12 as well as when the conventional light reflector 15 was attached to the illuminator 12. A 16-watt fluorescent lamp 13 was used in this experiment. Each precoated metal sheet was evaluated by comparing the illumination measured when a light reflector 15 made of the precoated metal sheet was attached with the illumination measured when the conventional light reflector 15 was attached as follows:

"Very good" when the illumination rate is not less than 110 percent,

"Good" when the illumination rate is not less than 103 percent and less than 110 percent, and "Bad" when the illumination rate is less than 103 percent, wherein the illumination rate is defined as [illumination measured when a light reflector made of a precoated metal sheet was attached]/[illumination measured when the conventional light reflector was attached]×100.

5) Bend Test of Coat of Precoated Metal Sheet (Workability)

A precoated metal sheet prepared was bent in close contact at a bend angle of 180 degrees at 20 degrees centigrade, and the damaged condition of the coat at the bent portion was observed with a magnifying lens. The workability was evaluated according to the following criterion. This test employed 3T bending in which the precoated metal sheet specimen was bent in close contact at a bending angle of 180 degrees while three sheets having the same thickness as the precoated metal sheet to be evaluated are inserted inside. This test was performed on both the visible light reflective coat side and the heat absorptive coat side of a precoated metal sheet.

"Good" when there is no damage in the coat,

"Normal" when the coat is damaged partially, and

"Bad" when the coat is violently damaged all over the bent portion.

6) Cupping Formability of Precoated Metal Sheet

A cupping test was performed on the conditions of a punch diameter of 50 millimeters, a punch shoulder R (radius of a punch shoulder) of 3 millimeters, a dice shoulder R (radius of the shoulder of a dice) of 3 millimeters, and a draw ratio of 2.1. At the time of the cupping test, a press test was performed without applying a press oil to the precoated metal sheet surface and with the visible light reflective coat surface being outside of the cup. The formability of a precoated metal sheet was evaluated as follows:

"Very good" when the precoated metal sheet can be formed into the designated shape completely without fracture of the base metal in the middle of forming, and no damage of the coat is visually observed.

"Good" when the base metal is fractured in the middle of forming the precoated metal sheet, but neither clear coat peeling nor coat damage is visually observed at the formed portion.

"Bad" when clear coat peeling or coat damage is visually observed regardless of the base metal being fractured in the middle of forming the precoated metal sheet.

"Good" when the blister width is not more than 3 millimeters on one side,

"Normal" when the blister width is less than 5 millimeters on one side, and

"Bad" when the blister width is more than 5 millimeters on one side.

8) Conductivity of Heat Absorptive Coat of Precoated Metal Sheet

A conductivity of a heat absorptive coat of the precoated metal sheet prepared was measured. An electric resistivity of a surface of a heat absorptive coat of the precoated metal sheet was measured by the four probe method using a resistivity meter "Loresta-EP/MCP-T360" by Mitsui Chemicals, Inc., and the conductivity was evaluated according to the following criterion:

"Good" when the electric resistivity is less than $0.1 \times 10^{-2}$ ohms,

"Normal" when the electric resistivity is not less than $0.1 \times 10^{-2}$ ohms and less than $1.0 \times 10^{-1}$ ohms, and "Bad" when the electric resistivity is not less than $1.0 \times 10^{-1}$ ohms.

Details of the evaluation results are given below.

Table 4 shows the evaluation results. In this connection, a reflective coating material I-5 (see Table 1) and heat absorptive coating materials I-12 and I-13 (see Table 2) among the prepared coating materials were thickened and solidified due to too much content of titanium oxide or carbon, and were difficult to coat. Therefore, precoated metal sheets using these coating materials could not prepared.

TABLE 4

| PCM No. | Visible ray diffuse reflectance of visible light reflective coat 400-700 nm | Gloss of visible light reflective 555 nm | Emissivity of heat absorptive coat | Illumination of illuminator | Workability Visible light reflective coat side | Heat absorptive coat side | Cupping formability | Corrosion resistance | Conductivity |
|---|---|---|---|---|---|---|---|---|---|
| PCM-I-1 | 0.85 | 0.87 | 90.3 | 0.80 | Very good | Good | Good | Very good | Good | Bad |
| PCM-I-2 | 0.85 | 0.87 | 90.3 | 0.80 | Very good | Good | Good | Very good | Good | Bad |
| PCM-I-3 | 0.73 | 0.76 | 90.3 | 0.80 | Good | Good | Good | Very good | Good | Bad |
| PCM-I-4 | 0.85 | 0.87 | 90.3 | 0.80 | Very good | Good | Good | Very good | Good | Bad |
| PCM-I-5 | 0.85 | 0.87 | 90.3 | 0.90 | Very good | Good | Normal | Very good | Good | Bad |
| PCM-I-6 | 0.85 | 0.87 | 90.3 | 0.90 | Very good | Good | Bad | Very good | Good | Bad |
| PCM-I-7 | 0.85 | 0.87 | 90.3 | 0.90 | Very good | Good | Bad | Very good | Good | Bad |
| PCM-I-8 | 0.85 | 0.87 | 90.3 | 0.72 | Good | Good | Good | Very good | Good | Bad |
| PCM-I-9 | 0.85 | 0.87 | 90.3 | 0.80 | Very good | Good | Good | Very good | Good | Bad |
| PCM-I-10 | 0.85 | 0.87 | 90.3 | 0.85 | Very good | Good | Good | Very good | Good | Bad |
| PCM-I-11 | 0.85 | 0.87 | 90.3 | 0.80 | Good | Good | Good | Very good | Good | Good |
| PCM-I-12 | 0.85 | 0.87 | 90.3 | 0.75 | Good | Good | Good | Very good | Good | Good |
| PCM-I-13 | 0.88 | 0.90 | 90.3 | 0.70 | Very good | Good | Good | Very good | Normal | Bad |
| PCM-I-14 | 0.82 | 0.85 | 90.3 | 0.80 | Very good | Good | Good | Very good | Good | Bad |
| PCM-I-15 | 0.85 | 0.87 | 90.3 | 0.80 | Very good | Good | Good | Very good | Good | Bad |
| PCM-I-16 | 0.85 | 0.87 | 90.3 | 0.80 | Very good | Good | Good | Very good | Good | Bad |
| PCM-I-17 | 0.85 | 0.87 | 90.3 | 0.80 | Very good | Good | Good | Very good | Good | Bad |
| PCM-I-18 | 0.85 | 0.87 | 90.3 | 0.80 | Very good | Good | Good | Good | Good | Bad |
| PCM-I-19 | 0.88 | 0.90 | 90.3 | 0.65 | Very good | Good | Good | Very good | Good | Bad |
| PCM-I-20 | 0.60 | 0.68 | 90.3 | 0.80 | Bad | Good | Good | Very good | Good | Bad |
| PCM-I-21 | 0.85 | 0.87 | 90.3 | 0.65 | Bad | Good | Good | Very good | Good | Bad |

7) Corrosion Resistance of Precoated Metal Sheet

A method of evaluating a corrosion resistance of the surface is described below.

A cut crack is made in the visible light reflective coat surface of the precoated metal sheet prepared, and thereafter a salt spray test was performed according to the method described in JIS K 5400.9.1. Salt water was sprayed on the surface having a cut crack. Test time was 120 hours. The width of coat blister from the cut crack on the surface was measured and the corrosion resistance was evaluated as follows:

The illuminators employing the precoated metal sheets of the present invention as light reflectors had higher and brighter illumination than one employing the conventional light reflector. It is unsuitable for the content of a titanium oxide in the visible light reflective coat to be less than 65 parts by weight based on 100 parts by weight of the solid content of the binder (PCM-I-20) because the visible light reflectance is less than 0.70 and the illumination is not different from that of the conventional light reflector. It is also unsuitable for the content of carbon in a heat absorptive coat to be less than 10 parts by weight based on 100 parts by weight of the solid content of the binder (PCM-I-21) because the emissivity is less than 0.70 and the illumination is not different from that of the conventional light reflector. It is preferable that carbon added to a heat absorptive coat is a combination of the large particle size carbon and the small particle size carbon (PCM-I-9 and PCM-I-10) because a comparatively large amount of carbon can be added without thickening. It is preferable that a conductive pigment is added to the heat absorptive coat (PCM-I-11 and PCM-I-12) because the conductivity can be given to the heat absorptive coat. However, if the content of a conductive pigment is increased, the emissivity of the heat absorptive coat declines and, therefore, the content of the conductive pigment is preferably not more than 50 parts by weight based on 100 parts by weight of the solid content of the binder. The precoated metal sheet which neither comprises a rust preventing coat under the visible light reflective coat or the heat absorptive coat nor contains a rust preventing pigment in these coats (PCM-I-13) has an inferior corrosion resistance. A precoated metal sheet treated by a chromate-based conversion treatment or comprising a chromate-based rust preventing pigment in the coat (PCM-I-14) comprises an environmental impact material and, therefore, a precoated metal sheet neither treated by such a treatment nor comprising such a pigment is preferred.

It is preferable that the binder resin of the visible light reflective coat is a fluororesin (PCM-I-19) because the visible light reflectivity is improved.

The present invention has made it possible to provide the technology for improving brightness of light of an illuminator or a light signal-emitting instrument. The present invention has made possible not only the improvement of the performance of these apparatus, but also securing performance equivalent to the former with smaller energy consumption than the former, and has also made possible the providing of energy saved apparatus. Therefore, it can be said that the present invention has a valuable industrial applicability.

The invention claimed is:

1. A precoated metal sheet for light reflectors, comprising a metal sheet or plated metal sheet, a visible light reflective coat provided on one surface of the metal sheet or plated metal sheet, and a heat absorptive coat provided on the other surface of the metal sheet or plated metal sheet, wherein the visible light reflective coat has a diffuse reflectance of visible rays of not less than 0.7 in a wavelength of 400 to 700 nanometers, and the heat absorptive coat has a total emissivity of infrared rays of not less than 0.7 in the range of wave number of 600 to 3000 $cm^{-1}$ measured at a certain temperature within the range of from 80 to 200 degrees centigrade.

2. A precoated metal sheet for light reflectors according to claim 1, wherein the visible light reflective coat comprises a binder and a titanium oxide, a content of the titanium oxide being 40 to 250 parts by weight, based on 100 parts by weight of a solid content of the binder.

3. A precoated metal sheet for light reflectors according to claim 1, wherein the binder in the visible light reflective coat comprises a fluororesin.

4. A precoated metal sheet for light reflectors according to claim 1, wherein the heat absorptive coat comprises a binder and a heat absorptive pigment, a content of the heat absorptive pigment being 10 to 150 parts by weight, based on 100 parts by weight of a solid content of the binder.

5. A precoated metal sheet for light reflectors according to claim 4, wherein the heat absorptive pigment is a carbon.

6. A precoated metal sheet for light reflectors according to claim 4, wherein the heat absorptive coat further comprises a conductive metal powder, a content of the conductive metal powder being from 1 to 50 parts by weight, based on 100 parts by weight of a solid content of the binder.

7. A precoated metal sheet for light reflectors according to claim 1, wherein the surface roughness Ra of the metal sheet or plated metal sheet is 0.05 to 1.8 micrometers.

8. A precoated metal sheet for light reflectors according to claim 1, wherein the metal sheet or plated metal sheet is a steel sheet or a plated steel sheet.

9. An electric or electronic apparatus comprising a precoated metal sheet for light reflectors according to claim 1.

* * * * *